United States Patent
Zelson

(12)
(10) Patent No.: US 6,253,662 B1
(45) Date of Patent: Jul. 3, 2001

(54) COFFEE MACHINE

(76) Inventor: Steve Terry Zelson, 7 Hidden Green La., Larchmont, NY (US) 10538

( * ) Notice: Subject to any disclaimer, the term of this patent is extended or adjusted under 35 U.S.C. 154(b) by 0 days.

(21) Appl. No.: 09/281,669

(22) Filed: Mar. 30, 1999

Related U.S. Application Data

(60) Provisional application No. 60/113,057, filed on Dec. 21, 1998.

(51) Int. Cl.[7] .................................................. A47J 31/00
(52) U.S. Cl. ................................ 99/279; 99/290; 99/304
(58) Field of Search ........................ 99/295, 279, 289 R, 99/304, 306, 316, 290

(56) References Cited

U.S. PATENT DOCUMENTS

| | | | |
|---|---|---|---|
| D. 250,690 | 1/1979 | Felske | D7/130 |
| D. 256,978 | 9/1980 | Dogliotti | D7/123 |
| D. 267,325 | 12/1982 | Zimmerman et al. | D7/309 |
| D. 290,914 | 7/1987 | Carlson | D6/474 |
| D. 366,183 | 1/1996 | Sintchak | D7/388 |
| 3,955,713 | 5/1976 | Hurley | 222/129.4 |
| 4,055,114 | 10/1977 | Kats et al. | 99/280 |
| 4,083,294 | 4/1978 | Petry | 99/279 |
| 4,495,404 | 1/1985 | Carmichael | 219/281 |
| 4,704,954 | 11/1987 | Mollenhoff | 99/279 |
| 4,759,274 * | 7/1988 | Schmidt | 99/295 |
| 4,969,392 * | 11/1990 | Steele et al. | 99/295 X |
| 5,000,082 * | 3/1991 | Lassota | 99/304 |
| 5,075,005 | 12/1991 | Brindopke | 210/477 |
| 5,097,984 | 3/1992 | Meisner et al. | 221/37 |
| 5,197,630 | 3/1993 | Kirla | 221/37 |
| 5,239,914 | 8/1993 | Salomon et al. | 99/285 |
| 5,676,041 * | 10/1997 | Glucksman et al. | 99/295 X |
| 5,799,613 | 9/1998 | Moore | 141/358 |
| 5,836,169 | 11/1998 | Marlette | 62/331 |

* cited by examiner

*Primary Examiner*—Reginald L. Alexander

(57) ABSTRACT

This invention relates to a drip-type coffee makers or machine having an integrated storage compartment for unused paper cone-type coffee filters.

24 Claims, 8 Drawing Sheets

COFFEE MACHINE

CROSS-REFERENCE TO RELATED APPLICATIONS

This application claims priority under 35 U.S.C. 119 of provisional application 60/113,057 filed on Dec. 21, 1998, the contents of which are fully incorporated herein by reference.

BACKGROUND OF THE INVENTION

The prior art provides numerous embodiments of holders/dispensers for paper coffee filters of the non-cone variety, e.g. pleated basket type. In those constructions the paper filters nest within one another, like the skin of an onion. Each time one is used or dispensed the next one presents itself. However, the prior art does not show a drip-type coffee makers or machine having or being formed with a compartment for unused paper cone-type coffee filters of the kind used in such machine. When such filters are needed for the machine it is necessary to obtain them from some other location, typically the box in which they were purchased.

Cone-type paper coffee filters, as opposed to basket type filters stack upon each other and do not nest within one another prior to use. FIG. 1 illustrates the configuration of a typical construction of a cone-type (e.g., Melitta type) filter described above. The filter itself has a modified cone outline when unexpanded and shape when expanded. They may be formed by folding a filter paper, e.g., a triangle shaped filter paper, upon itself along edge 3 (FIG. 1), cutting said paper and crimping edge 2 (FIG. 1) from point A to arc edge 1 (FIG. 1), leaving edge 1 (FIG. 1) uncrimped in order to enable to expansion along arc edge 1 (FIG. 1) into a cone-shaped filter. FIG. 3 shows two cone filters of different sizes superimposed upon one another. FIG. 2 shows the filter paper as expanded and in a configuration for into which coffee grounds are placed after said filter is placed within a filter support structure, which could itself be located inside of a drip-type coffee machine or directly upon a coffee urn or pot or cup.

Before being placed on a support structure within a coffee making machine or placed directly above a coffee cup or pot and expanded in a support structure to reveal the cone shape within which the coffee grounds are placed, the cone-type paper coffee filters are typically pressed or folded flat and placed on top of one another within a paper box. The dimensions of the box roughly correspond to the depth being based on the number of filters present in the box (collective thickness of filters present); the height of the box being the straight line distance from one point on the circumference of the flat pressed filter to a point directly opposite it (often one side of the flat filter is the one which has been bounded together so as to form the cone shaped filter itself when expanded) and the width of the box actually corresponding to the straight line distance on the flat pressed filter from the bottom of the filter to the top of the filter. The box typically open from the top by way of a paper flap whereby the filters can be retrieved. FIG. 4 illustrates the configuration of the filter and box described above. This box is typically where filters are located when not in use.

The prior art provides numerous examples of holders for basket type filter holders than cone-type (e.g., Melitta-type) coffee filters. For example see U.S. Pat. Nos. 5,097,984 and 5,197,630. Moreover, these holders are separate from and not integrated into a coffee machine. The prior art embodiments for cone-type (e.g., Melitta-type) coffee filter holders, however, are not sealable and are open to the surrounding environment as, for example, the Melitta disposable paper filter holder made and sold by Melitta USA, Inc. The disadvantages of an open holder is that the filters are open to the environment and may become dirty and possibly unusable from contamination in the local, typically kitchen, environment (e.g., via dust, dirt, insects, liquids or other means). In addition, these filter holders are not designed to be capable of holding cone filters of different sizes at different times or simultaneously. In the case of the Melitta filter holder, it is open at the top, unsealable and is made of plastic. There is adhesive on the holder that permits the open filter holder to be stably affixed to an object such as a coffee machine or wall and thereby not fall down if placed in an upright position. Similarly, the open to the environment cone-type filter holder marketed by Emsa GMBH is designed to be hung from a supporting rack or bar. In addition, the Emsa holder is designed with an upper surface which curves to correspond only to the curve or arc edge 1 (FIG. 1) on a certain size filter which fits exactly within it.

At present, however, there are no resealable storage holder or compartment for unused cone-type paper coffee filters located on or formed as an integrated part of a coffee machine.

It is, therefore, an object of the present invention to provide a sealable and cone-type filter storage compartment as part of a coffee maker or machine.

It is a further object of this invention to provide a coffee filter compartment on a coffee machine which is capable of holding cone-type coffee filters of different sizes (e.g., size nos. 2, 4 or 6 or the approximate equivalent size 102, 104, 106) which are usable on said coffee maker or machine and which would allow easy access to the filters when it is desired to make different amounts of coffee.

It is an additional object of this invention to provide a cone-type coffee filter compartment-dispenser integrated on a coffee machine which presents cone type coffee filters in a manner which facilitates retrieving one filter at a time.

SUMMARY OF THE INVENTION

This invention comprises a drip-type coffee maker further comprising an integrated non-expanded cone-type paper coffee filter compartment capable of storing a plurality of unused paper coffee filters.

DETAILED DESCRIPTION OF THE INVENTION

Figure 5:
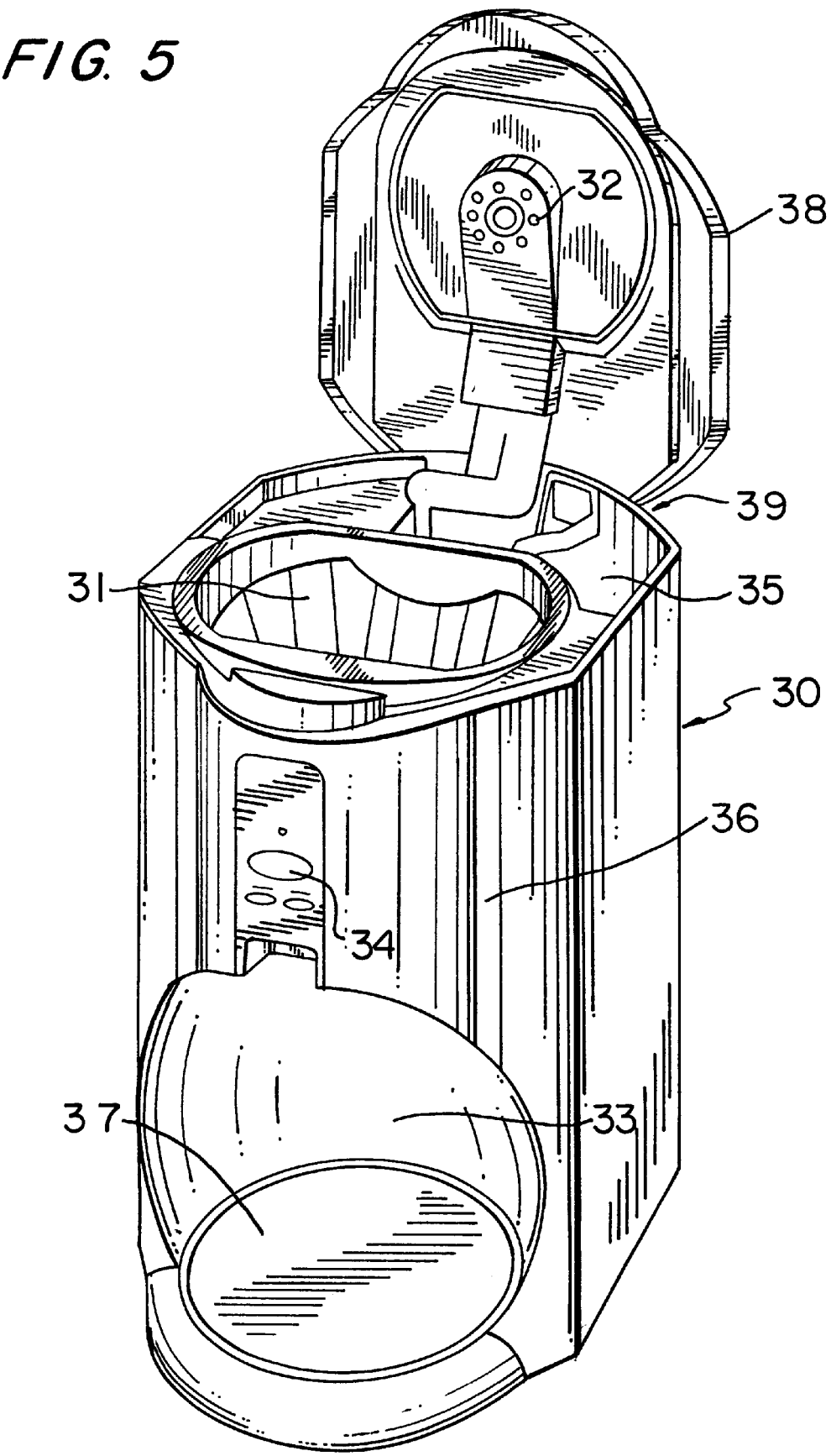
FIG. 5 shows a front perspective view of a typical coffee machine which uses cone filters.

Coffee is one of the world's most popular beverages. There are numerous ways to serve it and prepare it. One of the most popular ways to prepare at present is via the drip method typically in a coffee maker or machine as shown in FIG. 5, 30. As used herein the terms "coffee maker or machine", "coffee maker" or "coffee machine" are used interchangeably to indicated a device, typically electrically powered, which is used to make coffee by the drip method using cone-type filters typically being manufactured with a plastic body. Such machines are widely commercially available from such manufacturers as Krups, Braun, Melitta, Cusinart, Kitchen Aid and Sunbeam.

In this method, coffee grounds (coffee beans ground up into small fragments) are placed into a cone shaped filter (e.g., such as that manufactured by Melitta USA Inc.) or pleated cup shaped filter, typically made of paper or metal, placed in a supporting structure or basket 31 (usually removable from the machine), a lid 38 (typically attached by a hinge 39 to the coffee machine body) is lifted and water is added to reservoir 35 (the amount of water present being measured on gauge 36), after which the coffee machine is turned on (e.g., at switch 34) thereby causing a heating element to heat said water after which said hot water, typically coming from openings 32, is then poured over said coffee grounds. A liquid which comprises an even finer suspension of coffee particulates and other substances from the ground coffee beans passes through the filter into a holding receptacle such as a coffee urn, pot (located on said machine under the filter support at position 33) or cup and which may be kept warm by heater 37.

Depending on the volume of coffee to be prepared and/or the size of the receptacle and depending if the coffee to be made manually (with a person pouring the hot water over the grounds) or by a coffee machine (with the machine pouring the hot water over the grounds), a different size filter may be used. Such filters are typically given number designations such as 1, 2, 4, 6 and 8 [or their substantial equivalent 101, 102, 104, 106 or 108; 1×1, 1×2, 1×4, 1×6 or 1×8], with the smaller numbers indicating respectively smaller sized filters (having a smaller radius or distance from point A, FIG. 1).

The primary difference in size of a filter is primarily the length of the radius from point A at the bottom of said filter (e.g., the location on the filter where the sides come closest together with the bottom of said filter being in a horizontal/parallel disposition relative to the horizontal/flat surface of a filter support surface) to the top arc edge 1 of said filter (e.g. the portion of said filter which expands to yield the cone shape and from which side said coffee grounds are added to the filter. The angle of the sides of said pressed flat filter can be seen in FIG. 1 wherein angles C and D are both about 50 degrees from the horizontal although the exact angle can be modified as required and the compartment of the invention herein can be designed to accommodate any filter angle. The bottom of said filter, as noted above, is typically flat or horizontal as on surface E, however, it may also have rounded corners point F, or both sides could progress to a central point of said cone.

Figure 1:
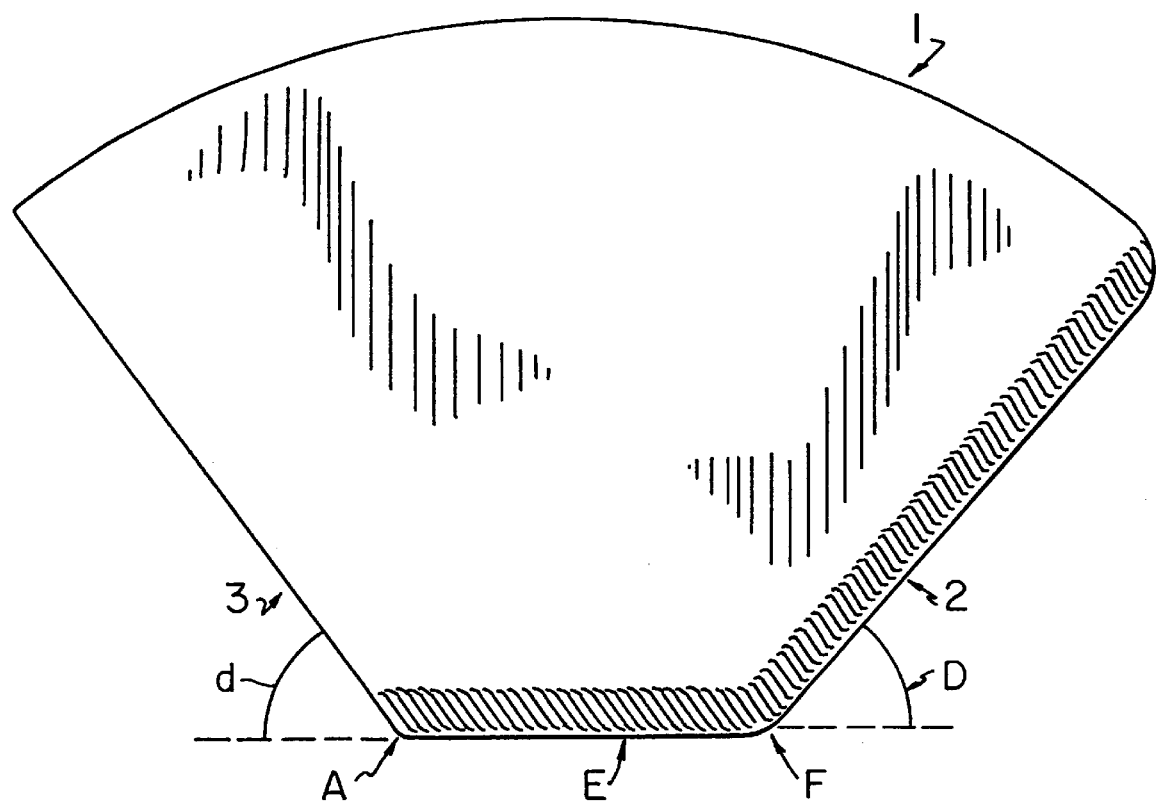
FIG. 1 shows a plan view of a typical cone type (Melitta) filter in an unexpanded form.
Figure 2:
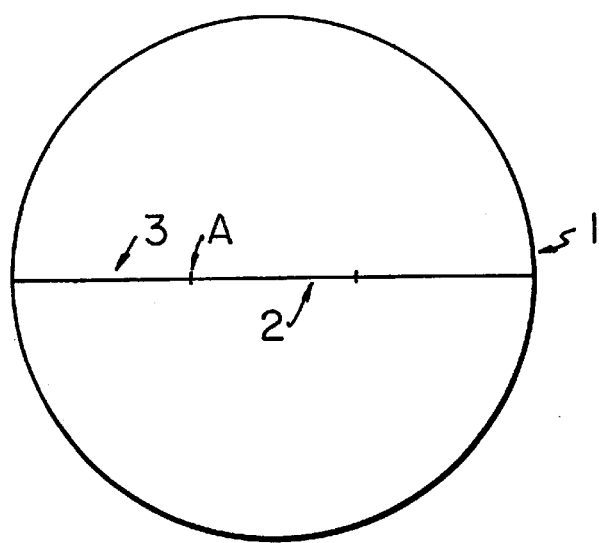
FIG. 2 shows a plan view of a cone-type coffee filter in the expanded configuration.
Figure 3:
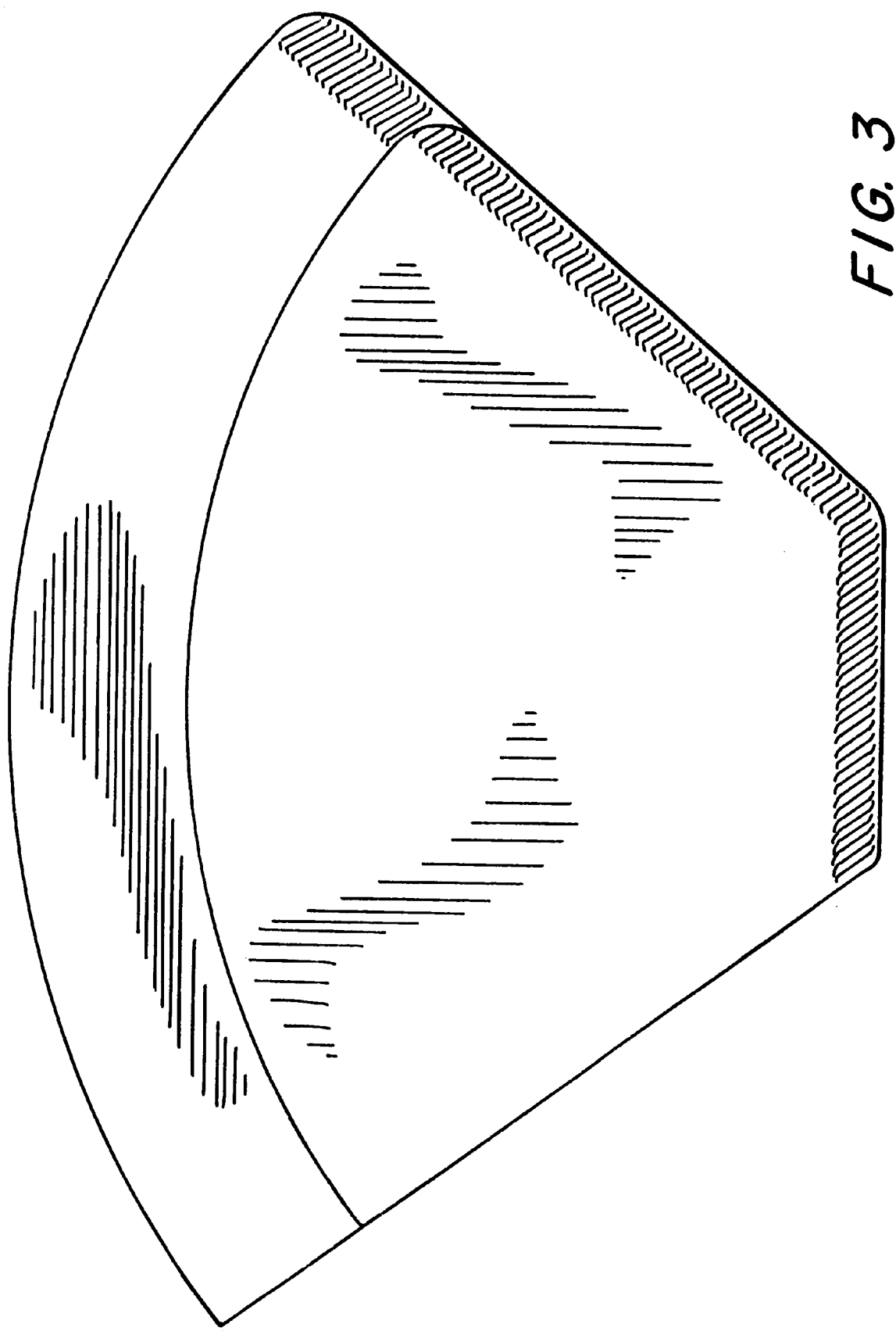
FIG. 3 shows a plan view of two typical unexpanded cone filters of different sizes superimposed upon one another.
Figure 4:
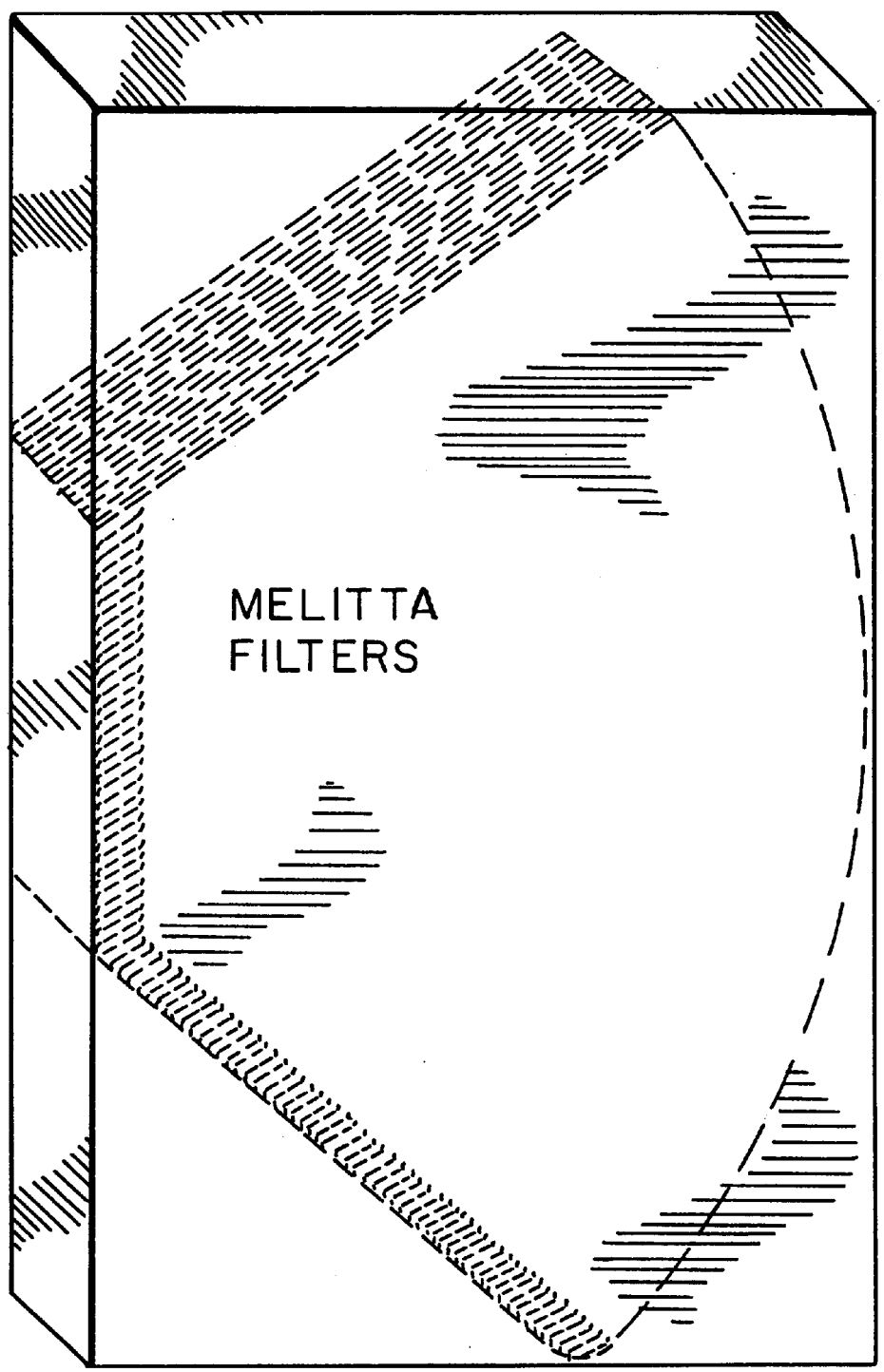
FIG. 4 shows a perspective view of a cone-type coffee filter in the paper box in which it is typically sold.

Most filters manufactured for drip use today utilize the flat or horizontal configuration for the bottom as seen in FIG. 1. The top edge of said filter has an arc edge shape which, when said filter is fully opened, is capable of taking on a circular or semi-circular configuration (around the upper surface of said filter holder in said coffee maker or holder. The standardization of the angles of said sides of the cone filter allows for standardization of both the filters and the coffee machines which use them. The angles of said filter sides and bottom typically correspond to the angles and bottom configuration on the filter support structures found within said machines and in single-use filter coffee makers.

It a most preferred embodiment the invention herein comprises a storage compartment for non-expanded cone-type paper coffee filters comprising a drip-type coffee machine further comprising an integrated, non-expanded cone-type paper coffee filter compartment capable of storing a plurality of said paper filters. In an example of this preferred embodiment, the coffee filter compartment of this invention is constructed so as to be integrated with and/or formed onto a coffee maker machine and as shown in FIGS. 6, 7, 8 and 9.

Figure 6:
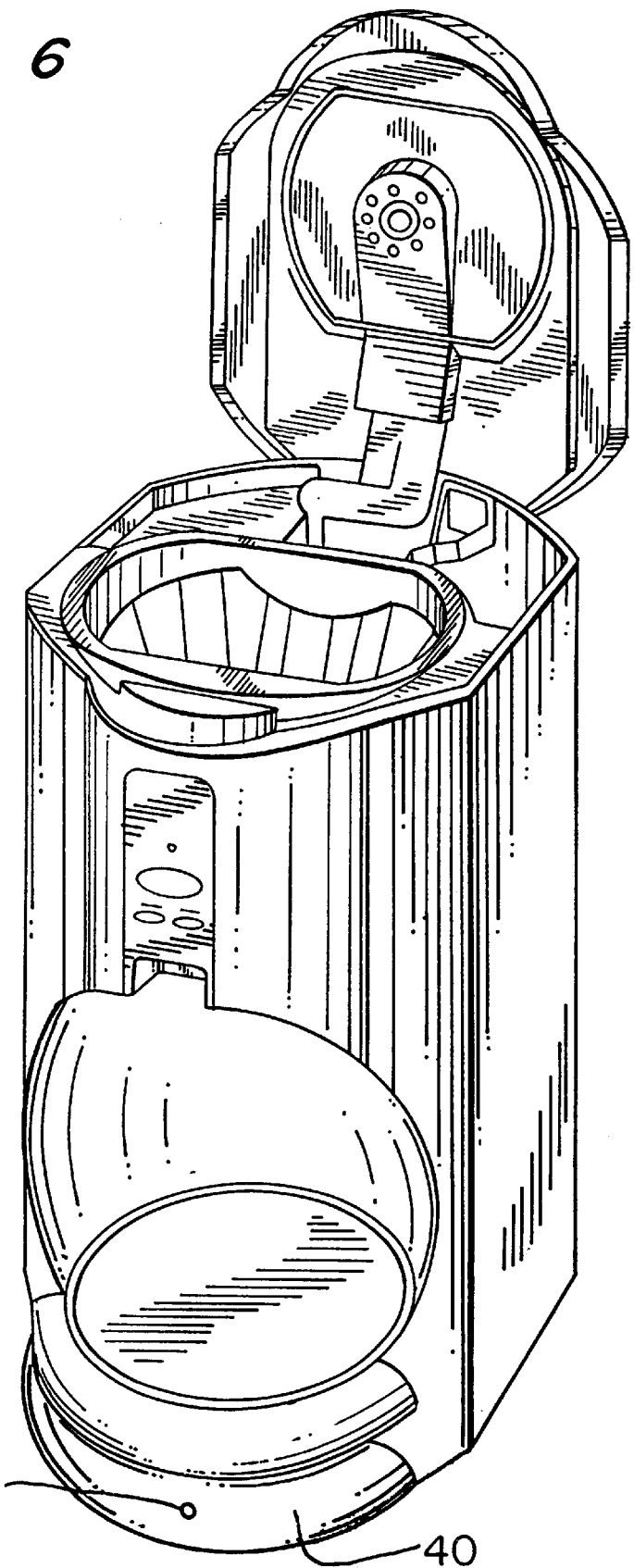
FIG. 6 shows a front perspective view of an embodiment of the coffee maker of this invention with a filter holding drawer on the bottom of said coffee maker.
Figure 7:
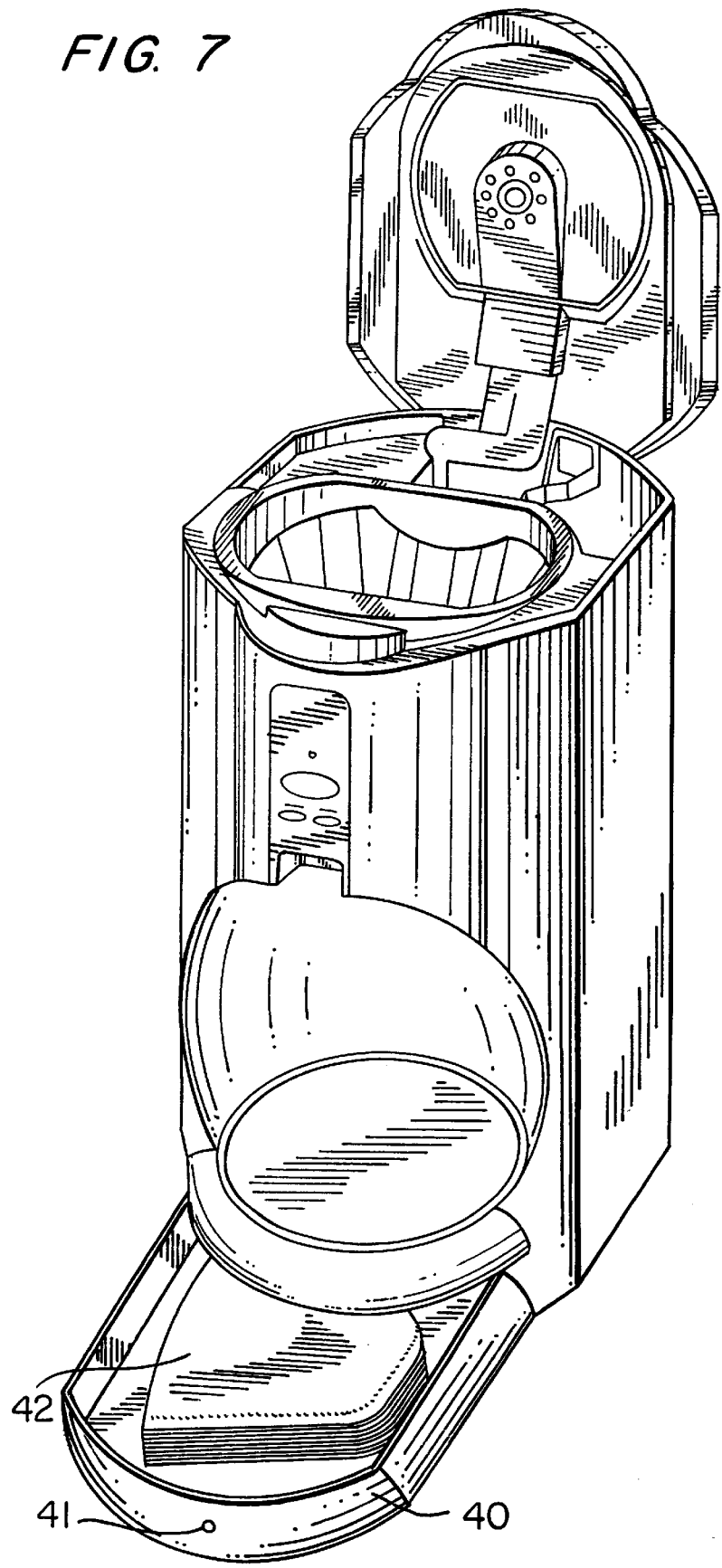
FIG. 7 shows a front perspective view of the coffee maker of the FIG. 5 with the filter drawer open and containing unused cone-type filters.

In a preferred embodiment, the filter compartment comprises a drawer 40 (with knob 41, a non-critical element, to assist in opening said drawer) as shown in FIGS. 6 and 7. The filter storage drawer compartment could preferably fit on the bottom of a coffee machine as shown in the attached FIGS. 6 and 7 or at some point above the bottom of the coffee maker machine. The frame or assembly within which said drawer is disposed when closed may also optionally include insulating type material, for example on the top of the drawer or frame or assembly, or allow for insulating space between the other elements of the coffee machine, such as the heating pad upon which the coffee pot may sit to remain warm, and the filters within said drawer. In another embodiment, the upper surface of said drawer (between the drawer and the other element of said coffee machine) could also comprise insulating means such as selected from the group consisting of cork, wood, plastic, rubber, glass, metal, air space, vacuum, textiles, mineral fibers, carbon fiber, glass fiber, ceramic or a combination of two or more of these materials.

The drawer could optionally include indicia such as the label "coffee filters" or the appropriate filter number or other numbers, preferably on the face of said drawer. The drawer could be opened in the typical fashion by pulling it directly out from the frame or assembly as shown in FIG. 7. Alternatively, the drawer could be opened by a pivoting action via a hinge means connected at one of the front sides of the drawer to said coffee machine body. As with the other embodiments described above, each filter storage drawer compartment can hold at least one size cone filter and preferably filters of more than one size; each filter storage compartment and/or its walls can be opaque or transparent or have any desired color or design pattern. The drawer, frame or assembly may be constructed of any durable material such as plastic, rubber, metal, ceramic, wood, or glass.

Optionally, each drawer can also be shaped or formed internally in two dimensions to approximate the outline shape of a designated coffee filter. Alternatively, said drawer may include permanent or temporary inserts or guides which would allow a substantially square or rectangular drawer to have inner dimensions which substantially match a desired filter outline (as for example a cutlery drawer insert often includes places to insert and properly fit spoons or forks). Externally, the drawer face can optionally be shaped to conform with the design lines of the coffee machine itself.

Figure 8:
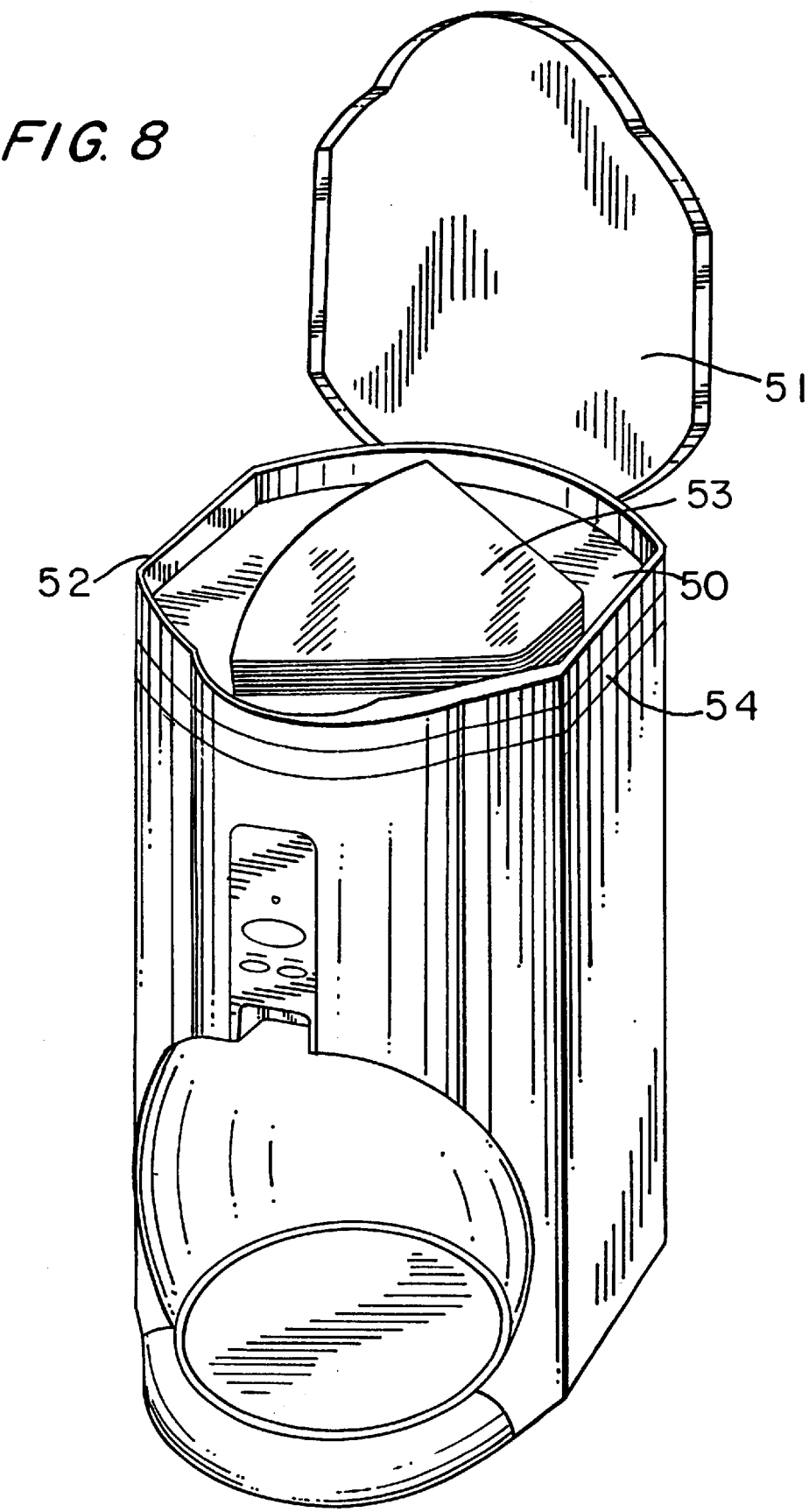
FIG. 8 shows a front perspective view of another embodiment of the coffee maker of this invention with a hinged filter holding compartment at the top of said coffee maker with said compartment being open.
Figure 9:
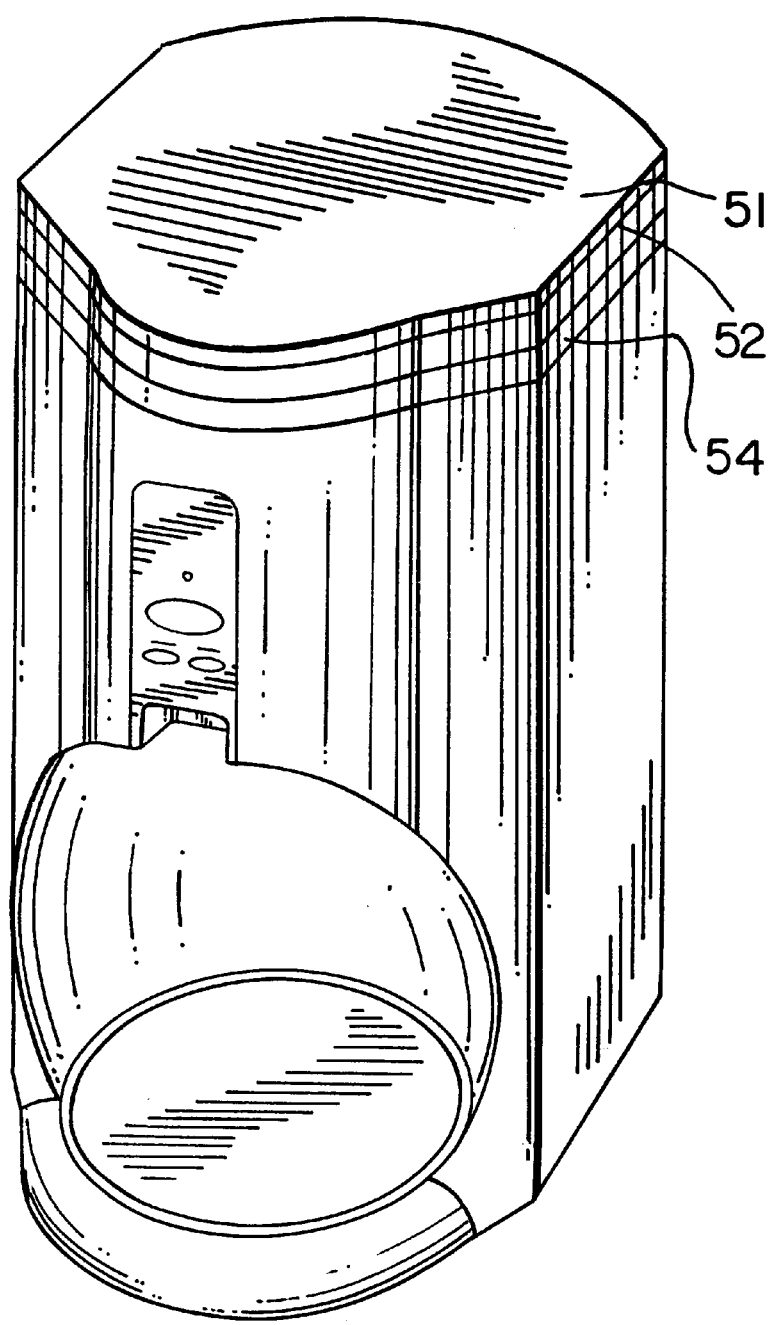
FIG. 9 shows a front perspective view of the coffee maker of FIG. 7 with said compartment being closed.

In another preferred embodiment, as shown in FIGS. 8 and 9, the filter storage compartment is located at the top of the coffee machine. In this embodiment the compartment 50 is located beneath lid 51 and which lid when closed rests on and interfaces with ledge or edge 52. Lid 51 may be attached to the coffee machine by a variety of means including but not limited to and most preferably, hinge means. Compartment 50 is of sufficient size to hold a plurality of unused cone-type filters 53. Compartment 50, in this embodiment, is preferably located above a second lid 54 which may be lifted up together with compartment 50 to reveal, among other components, e.g., the input port for the water reservoir (as in FIG. 5, 35), the filter support structure (as in FIG. 5, 31), and the hot water output ports (as in FIG. 5, 32). The lid 51 to compartment 50 can be opened without having to open the second lid 54, however, in this embodiment and as shown in FIGS. 8 and 9, opening second lid 54 will also lift but not necessarily open compartment 50. It is envisioned, however, that there are many possible alternate constructions within the scope of this invention where the filter storage compartment could be on the top of the coffee machine yet separate and independent of the lid to the water reservoir, filter support structure or hot water outlet ports (as, for example, where the two lids are designed to be in a side-by-side configuration).

The lid to the compartment holding the filters optionally includes size indicia (e.g., No. 2 or 4 size), e.g., on the top surface or front. The filter storage compartment or body itself is preferably shaped and sized in the form of and so as to retain an unused cone filter of a particular size. In the embodiment of FIGS. 8 and 9, the cover is aligned with the side of the filters lying on their side, parallel to the plane of the ground. Said filter compartment may also include permanent or temporary inserts or guides which would allow a compartment to have inner dimensions which substantially match a desired filter shape outline. The filter compartment and/or lid may be opaque or transparent or have any desired color, combination of colors or design pattern and/or match that of the coffee machine itself. The filter compartment width or depth could be sufficient to hold an entire box of filters (e.g., 100 filters) or more or less. The lid for engaging the open end of said compartment and sealing it against moisture and dust could optionally simply rest on, pressure fit or attach by hinge means (and/or optionally include a latch means typically opposite said hinge).

The filter storage compartment and/or lid can be constructed of any durable material as the coffee machine which is typically a plastic but could also be or include components such as rubber, metal, wood, glass, ceramic, textile, mineral, carbon fiber, glass fiber or any combination of the above. Any one of many commercially available types of these materials would be suitable such as, but not limited to, with plastics generally including: polyethylene, thermoplastics, polypropylene, polystyrene, polyurethane, polycarbonate, polyvinyl and polyvinyl chloride. More specifically, plastics which may be used include: Thermoplastics including alloys and blends thereof (e.g., Nylon/ABS; PPO/Nylon; ABS/PC; PC/PBT), Ketone-based resins, Nylon, Polycarbonate, Polybutylene terephthalate (aka, PBT); Polycyclohexylenedimethylene terephthalate (aka, PCT); Polyethylene terephthalate (aka, PET); Polyethylene; Polymethylpentene; Polypropylene (aka, PP), including PP homopolymer, PP impact copolymers and PP randomcopolymers; Styrenic resins such as ABS (made up of three monomeric building blocks: acrylonitrile, butadiene and styrene), ACS (made up of three monomeric building blocks: acrylonitrile, chlorinated polyethylene and styrene); polystyrene (aka PS) including impact PS; Styrene-acrylonitrile (aka, SAN); Vinyl-based resins such as polyvinyl chloride; Theromosets such as Allylic resins and Polyester resins; and is also intended to include composite raw materials such as Bulk molding compounds (aka, BMC) which is prepared by blending resin (e.g., unsaturated polyesters), catalyst, powdered mineral filler, reinforcing fiber [chopped strand], pigment, lubricants and other additives.

The metals which are contemplated for construction of the compartment body of this invention include but are not limited to, steel, stainless steel, aluminum and various metal alloys. It is also preferable if the material used for the filter compartment and lid or drawer embodiments disclosed herein to be able to withstand high temperatures such as those found on coffee makers. It is envisioned that the coffee machine of this invention can be formed by various common process such as molding (e.g., blow molding, injection molding), shaping the material into the desired form (e.g., press molding) or by assembly of individual pieces formed in these same or different ways.

In another embodiment, the filter storage compartment is located or formed on one of the sides of said coffee machine. The lid to said compartment could open up (towards the top of the coffee machine) or towards the front or back of the coffee machine (or towards the bottom if means were present to keep the filters from falling out). In this embodiment the lid is also preferably attached by hinge means but could also comprise a drawer type structure. It is also envisioned that in this (or any of the other embodiments disclosed herein) that the operation of opening the lid could optionally move a tab element which could push out one filter at a time (alternatively through a slot present on said lid or coffee machine body without having to open the lid by moving a tab or lever connected to said lid which communicates through said lid to said filters).

Generally, any of the above embodiments of the coffee machine invention herein will include at least one or more of the following characteristics:

1) Each filter storage compartment can hold at least one size cone filter and preferably more than one size. This is possible because the relative angles on said filters are essentially the same for different size filters.

2) Each filter storage compartment and/or lid on said coffee maker can be opaque or transparent or have any desired color or design pattern.

3) Each filter storage compartment and/or lid on said coffee maker can be constructed of any durable material such as plastic, rubber, metal, wood, glass, ceramic, textile, mineral, carbon fiber, glass fiber or any combination of the above. Any on e of many commercially available types of these materials would be suitable such as, but not limited to, with plastics (polymers): polyethylene, thermoplastics, polypropylene, polystyrene, polyurethane, polycarbonate, polyvinyl and polyvinyl chloride or any of the specific plastic types listed herein above. The metals which are contemplated for construction of the compartment of this invention include, but are not limited to, steel, stainless steel, aluminum and various alloys. It is also preferable if the material used for the filter storage compartment in any of the embodiments disclosed herein be able to withstand high temperatures such as those found on coffee makers. It is envisioned that the coffee machine of this invention can be formed by various common process such as molding (e.g., blow molding, injection molding), shaping the material into the desired form (e.g., press molding) or by assembly of individual pieces formed in these same or different ways.

4) Each filter storage compartment and/or lid can be labeled with indicia such as numbers (e.g., which numbers corresponds to filter size or sizes) and/or brand names.

5) Each filter storage compartment may be optionally constructed with an insert or inserts or guides conforming to filter edges thereby providing additional support for said cone filters disposed within said compartment.

6) Each filter storage compartment lid can be affixed to the body of the filter coffee maker by a variety of means including, but not limited to, resting on said coffee maker, pressure fit means (e.g., tongue and groove), or hinge means (with or without a latch means).

7) Each filter storage compartment dimensions can correspond to a "short" height configuration [from bottom edge E to top point of arc edge 1 on filter]×width [from one point on circumference of flat folded cone filter to the other]× number of filters to be held or a "tall" height configuration with the filters placed on their side and the arc edge 1 to one side and filter "bottom" edge E to other side.

8) Each sealable filter storage compartment can be affixed to or formed on the side, front, back, top or bottom of a coffee machine by commonly known means for affixing things such as adhesives, screws, wire, clips or hooks or can be formed, e.g., as an integrated unit, together with the rest of the coffee machine body such as the drawer embodiment.

9) Each filter storage compartment bottom for the embodiments which hold the filters in a vertical orientation (perpendicular to the ground) may be squared off, tapered or shaped to match general shape of filter bottom.

It should be understood that the examples and embodiments described herein are for illustration purposes only and that various modifications or changes in light thereof, such as the applicability of the invention herein to virtually any design coffee machine which uses cone-type filters, will be suggested to persons skilled in the art and are to be included within the spirit and purview of this application and the scope of the appended claims.

What I claim is:

1. A drip-type coffee machine further comprising an integrated non-expanded cone-type paper coffee filter compartment capable of storing a plurality of said filters wherein said non-expanded cone-type paper coffee filter drawer unit comprising a drawer body integrated with said coffee machine and having four sides and a bottom, being comprised of a durable material and shaped so as to accommodate a non-expanded cone-type paper coffee filter and a cabinet means having dimensions sufficient to encompass said drawer and comprising a top, and at least two sides, said drawer being removable from at least one open side of said cabinet.

2. The drip-type coffee machine of claim 1, wherein said cabinet further comprises a bottom to which said sides are affixed.

3. The drip-type coffee machine of claim 1, wherein said cabinet further comprises a third side.

4. The drip-type coffee machine of claim 1, wherein said sides of said drawer body is formed essentially in the two-dimensional shape of the non-expanded cone-type coffee filter which it will accommodate.

5. The drip-type coffee machine of claim 1, wherein said drawer body can accommodate non-expanded cone-type paper coffee filters of more than one size.

6. The drip-type coffee machine of claim 1, wherein said drawer compartment is of sufficient strength and size to support a drip-type coffee machine placed upon the top surface of said cabinet containing said drawer.

7. The drip-type coffee machine of claim 1, wherein the top surface of said cabinet further comprises and insulating means.

8. The drip-type coffee machine of claim 7, wherein said insulating means is selected from the group consisting of cork, wood, plastic, rubber, glass, metal, air space, vacuum, textiles, mineral fibers, carbon fiber, glass fiber, ceramic or a combination of two or more of these materials.

9. The drip-type coffee machine of claim 1, wherein said durable material of drawer unit comprises plastic, wood, glass, metal, ceramic or a combination of two or more of these materials.

10. The drip-type coffee machine of claim 1, wherein said storage drawer compartment cabinet or drawer is labeled with at least one numerical indicia corresponding to the filter number size which fit inside of it.

11. The drip-type coffee machine of claim 1, wherein said storage drawer compartment body is slidably removable from said cabinet.

12. The drip-type coffee machine of claim 1, wherein said storage drawer compartment body is attached to said cabinet by hinge means and is removable by a pivoting motion of said drawer compartment.

13. A drip-type coffee machine further comprising an affixed and sealable, non-expanded cone-type paper coffee filter compartment capable of storing a plurality of said filters, wherein said non-expanded cone-type paper coffee filter drawer unit comprising a drawer body affixed to said coffee machine and having four sides and a bottom, being comprised of a durable material and shaped so as to accommodate a non-expanded cone-type paper coffee filter and a cabinet means having dimensions sufficient to encompass said drawer and comprising a top, and at least two sides, said drawer being removable from at least one open side of said cabinet.

14. A drip-type coffee machine further comprising an affixed and sealable, non-expanded cone-type paper coffee filter compartment capable of storing a plurality of said filters, wherein said non-expanded cone-type paper coffee filter drawer unit comprising a drawer body affixed to said coffee machine and having four sides and a bottom, being comprised of a durable material and shaped so as to accommodate a non-expanded cone-type paper coffee filter and a cabinet means having dimensions sufficient to encompass said drawer and comprising a top, and at least two sides, said drawer being removable from at least one open side of said cabinet, wherein said cabinet further comprises a bottom to which said sides are affixed.

15. A drip-type coffee machine further comprising an affixed and sealable, non-expanded cone-type paper coffee filter compartment capable of storing a plurality of said filters, wherein said non-expanded cone-type paper coffee filter drawer unit comprising a drawer body affixed to said coffee machine and having four sides and a bottom, being comprised of a durable material and shaped so as to accommodate a non-expanded cone-type paper coffee filter and a cabinet means having dimensions sufficient to encompass said drawer and comprising a top, and at least two sides, said drawer being removable from at least one open side of said cabinet, wherein said cabinet further comprises a third side.

16. A drip-type coffee machine further comprising an affixed and sealable, non-expanded cone-type paper coffee filter compartment capable of storing a plurality of said filters, wherein said non-expanded cone-type paper coffee filter drawer unit comprising a drawer body affixed to said coffee machine and having four sides and a bottom, being comprised of a durable material and shaped so as to accommodate a non-expanded cone-type paper coffee filter and a cabinet means having dimensions sufficient to encompass said drawer and comprising a top, and at least two sides, said drawer being removable from at least one open side of said cabinet, wherein said sides of said drawer body is formed essentially in the two-dimensional shape of the affixed and sealable, non-expanded cone-type coffee filter which it will accommodate.

17. A drip-type coffee machine further comprising an affixed and sealable, non-expanded cone-type paper coffee filter compartment capable of storing a plurality of said filters, wherein said non-expanded cone-type paper coffee filter drawer unit comprising a drawer body affixed to said coffee machine and having four sides and a bottom, being comprised of a durable material and shaped so as to accommodate a non-expanded cone-type paper coffee filter and a cabinet means having dimensions sufficient to encompass said drawer and comprising a top, and at least two sides, said drawer being removable from at least one open side of said cabinet, wherein said drawer body can accommodate non-expanded cone-type paper coffee filters of more than one size.

18. A drip-type coffee machine further comprising an affixed and sealable, non-expanded cone-type paper coffee filter compartment capable of storing a plurality of said filters, wherein said non-expanded cone-type paper coffee filter drawer unit comprising a drawer body affixed to said coffee machine and having four sides and a bottom, being comprised of a durable material and shaped so as to accommodate a non-expanded cone-type paper coffee filter and a cabinet means having dimensions sufficient to encompass said drawer and comprising a top, and at least two sides, said drawer being removable from at least one open side of said cabinet, wherein said drawer compartment is of sufficient strength and size to support a drip-type coffee machine placed upon the top surface of said cabinet containing said drawer.

19. A drip-type coffee machine further comprising an affixed and sealable, non-expanded cone-type paper coffee filter compartment capable of storing a plurality of said filters, wherein said non-expanded cone-type paper coffee filter drawer unit comprising a drawer body affixed to said coffee machine and having four sides and a bottom, being comprised of a durable material and shaped so as to accommodate a non-expanded cone-type paper coffee filter and a cabinet means having dimensions sufficient to encompass said drawer and comprising a top, and at least two sides, said drawer being removable from at least one open side of said cabinet, wherein the top surface of said cabinet further comprises and insulating means.

20. A drip-type coffee machine further comprising an affixed and sealable, non-expanded cone-type paper coffee filter compartment capable of storing a plurality of said filters, wherein said non-expanded cone-type paper coffee filter drawer unit comprising a drawer body affixed to said coffee machine and having four sides and a bottom, being comprised of a durable material and shaped so as to accommodate a non-expanded cone-type paper coffee filter and a cabinet means having dimensions sufficient to encompass said drawer and comprising a top, and at least two sides, said drawer being removable from at least one open side of said cabinet wherein the top surface of said cabinet further comprises and insulating means and, wherein said insulating means is selected from the group consisting of cork, wood, plastic, rubber, glass, metal, air space, vacuum, textiles, mineral fibers, carbon fiber, glass fiber, ceramic or a combination of two or more of these materials.

21. A drip-type coffee machine further comprising an affixed and sealable, non-expanded cone-type paper coffee filter compartment capable of storing a plurality of said filters, wherein said non-expanded cone-type paper coffee filter drawer unit comprising a drawer body affixed to said coffee machine and having four sides and a bottom, being comprised of a durable material and shaped so as to accommodate a non-expanded cone-type paper coffee filter and a cabinet means having dimensions sufficient to encompass said drawer and comprising a top, and at least two sides, said drawer being removable from at least one open side of said cabinet, wherein said durable material of drawer unit comprises plastic, wood, glass, metal, ceramic or a combination of two or more of these materials.

22. A drip-type coffee machine further comprising an affixed and sealable, non-expanded cone-type paper coffee filter compartment capable of storing a plurality of said filters, wherein said non-expanded cone-type paper coffee filter drawer unit comprising a drawer body affixed to said coffee machine and having four sides and a bottom, being comprised of a durable material and shaped so as to accommodate a non-expanded cone-type paper coffee filter and a cabinet means having dimensions sufficient to encompass said drawer and comprising a top, and at least two sides, said drawer being removable from at least one open side of said cabinet, wherein said storage drawer compartment cabinet or drawer is labeled with at least one numerical indicia corresponding to the filter number size which fit inside of it.

23. A drip-type coffee machine further comprising an affixed and sealable, non-expanded cone-type paper coffee filter compartment capable of storing a plurality of said filters, wherein said non-expanded cone-type paper coffee filter drawer unit comprising a drawer body affixed to said coffee machine and having four sides and a bottom, being comprised of a durable material and shaped so as to accommodate a non-expanded cone-type paper coffee filter and a cabinet means having dimensions sufficient to encompass said drawer and comprising a top, and at least two sides, said drawer being removable from at least one open side of said cabinet, wherein said storage drawer compartment body is slidably removable from said cabinet.

24. A drip-type coffee machine further comprising an affixed and sealable, non-expanded cone-type paper coffee filter compartment capable of storing a plurality of said filters, wherein said non-expanded cone-type paper coffee filter drawer unit comprising a drawer body affixed to said coffee machine and having four sides and a bottom, being comprised of a durable material and shaped so as to accommodate a non-expanded cone-type paper coffee filter and a cabinet means having dimensions sufficient to encompass said drawer and comprising a top, and at least two sides, said drawer being removable from at least one open side of said cabinet, wherein said storage drawer compartment body is attached to said cabinet by hinge means and is removable by a pivoting motion of said drawer compartment.

* * * * *